Patented May 18, 1954

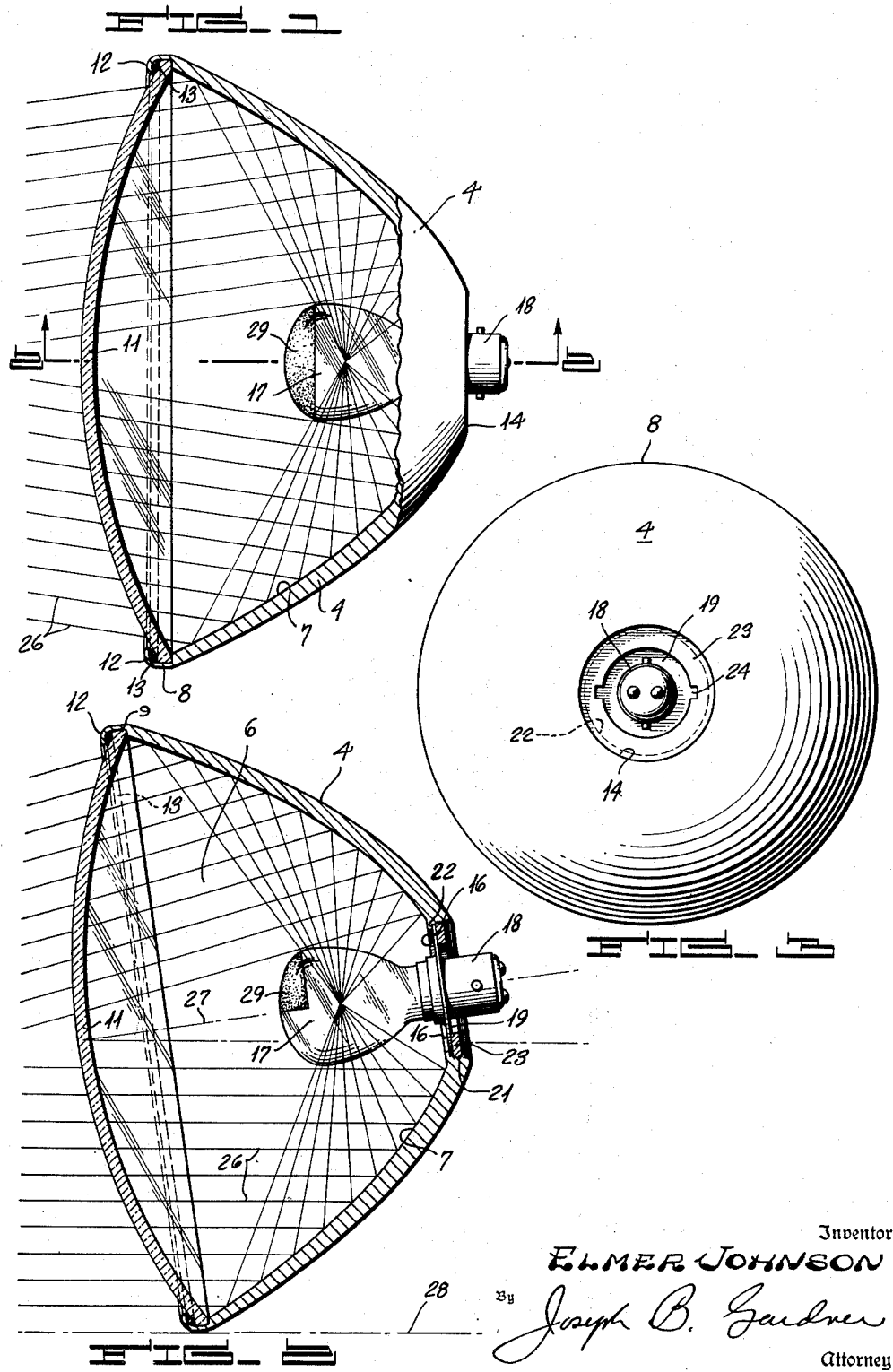

2,678,996

UNITED STATES PATENT OFFICE 2,678,996

NONGLARE AUTOMOBILE HEADLIGHT

Elmer Johnson, Oakland, Calif.

Application January 28, 1950, Serial No. 141,116

4 Claims. (Cl. 240—7.1)

This invention relates to beam projecting headlights such as commonly employed on automotive vehicles.

An object of the invention is to provide an improved headlight comprising reflector, lens and lamp elements joined together as an integral unit and arranged so that the lamp element may be removed and replaced as desired.

Another object of the invention is to provide a headlight unit of the type referred to including a unitary reflector and lens assembly and having improved means for sealing a replaceable lamp member thereinto.

A further object of the invention is to provide a headlight capable of arrangement so that all light rays emanating therefrom will not be projected at an upward angle relative to the general plane of the road surface over which the vehicle equipped with the headlight may be travelling.

The invention possesses other objects and features of advantage, some of which, with the foregoing, will be set forth in the following description of the invention which is illustrated in the drawing accompanying and forming part of the specification. It is to be understood, however, that variations in the showing made by the said drawing and description may be adopted within the scope of the invention as set forth in the claims.

Referring to the drawing:

Figure 1 is a top plan view, partly in horizontal section, of a headlight unit in which are embodied the improvements of my invention.

Figure 2 is a vertical sectional view taken in the plane indicated by the line 2—2 of Figure 1.

Figure 3 is a rear elevational view of the structure shown in Figure 1.

In carrying out my invention I provide a preferably metallic bowl-shaped shell 4 surrounding a cavity 6 having a paraboloidal peripheral surface 7 which is suitably silvered or aluminized and burnished so as to render it as highly light-reflective as possible. Bordering the larger end of the cavity 6 is an axially-extending lip 8 overlying a peripheral notch 9 in which is seated the circumferential edge of a clear glass lens 11 secured in the notch 9 by a rolled, inwardly-bent flange portion 12 of the lip 8, a rubber or other gasket 13 being interposed between the flange and lens to serve as a cushion and seal.

The shell 4, at the end thereof opposite the lens 11, is provided with a transaxially flattened portion 14 in which is provided an aperture 16 concentric with and opening into the cavity 6 and of sufficient diameter to permit the free insertion into the cavity of a conventional automobile headlamp 17 provided on the terminal stem 18 thereof with the usual disk-like mounting flange 19. An outwardly opening peripherally threaded counterbore 21 is also formed in the flattened end portion 14 of the shell in axial concentricity with the aperture 16 and provides an annular shoulder 22 bordering the latter in which the periphery of the flange 19 may be nested so as to both align the headlamp 17 axially concentrically with the cavity 6 and to accurately position the filament of the headlamp in registry with the generating center of the paraboloidally-shaped cavity. Such positioning and registration of the headlamp are secured by an annular nut 23 peripherally threaded for engagement in the counterbore 21 and provided with opposed spanner wrench notches 24 or the like by means of which the nut may be cinched tight so as to firmly clamp the headlamp flange 19 against the shoulder 22. This seals the cavity 6 against the entrance thereinto of dust or fumes which might tend to obscure or discolor the highly polished light reflecting surface of the cavity.

It will be particularly noted that the design of the cavity 6 differs somewhat from the shape usually given to conventional headlight reflectors or the light-reflecting portions of so-called sealed beam units in that the projected rays 26 of light converge slightly toward the beam axis 27 rather than being substantially parallel to the axis as in conventional construction. When a pair of the headlight units of my invention are mounted in the headlight casings of a vehicle with the projection axes 27 of the units in parallel relation with a vertical longitudinal plane of the vehicle, when the latter is viewed in plan aspect, the units will cast separate beams which although cross-sectionally convergent throughout their respective lengths reach a focal point beyond which the light rays relatively diverge to provide both spot and spread illumination of the road ahead. The preferred position of each headlight when viewed in a plane parallel to the road surface, which is indicated by the line 28 of Figure 2, is such that the axis 27 of the light beam is inclined downwardly, in the direction of beam projection, toward the road plane 28, the degree of inclination being such that the normally upwardly directed rays from the lower portion of the reflecting surface of the shell cavity will be brought into parallelism with the road plane while the rays from the upper portion of the reflector will be inclined at a greater angle than normally toward the road surface. Thus none of the rays comprising the respective reflected light beams will be projected at an upward angle relative to the general road surface and therefore cannot possibly be directed into the eyes of the operator of an approaching vehicle so as to momentarily blind him. Although some direct rays will be projected forwardly from the headlamp 17, the uppermost rays are intercepted by a translucent film shield 29 applied in a suitable manner on the frontal hemispherical portion of the lamp envelope.

The unit above described is markedly superior from an economical point of view than the so-called sealed beam headlight unit in general use at the present time for the reasons that, in the latter, once a filament burns out or the lens becomes cracked, the unit is rendered useless and must be replaced in its entirety. In the unit of my invention, the headlamp 17 comprises an independent and separable component of the headlight unit and is not functionally affected even though the lens or shell portion should become cracked or otherwise damaged. On the other hand, should the headlamp filament burn out or become broken due to excessive vibration or shock, substitution of a new lamp for the defective one may be readily accomplished by the simple procedure of removing and replacing the annular nut 23. The improved headlight unit of my invention is capable of being mounted, as evident to those skilled in the art, in any of the conventional headlight casings which form part of the structural equipment of automobiles and other automotive vehicles, and since such casings are familiarly capable of being adjustably positioned so as to project light beams emanating therefrom at various angles of inclination relative to the road surface over which the vehicle may be travelling, it is unnecessary herein to show the specific details of construction of such a casing.

I claim:

1. A headlight unit for mounting in the headlight casing of an automotive vehicle comprising a generally cylindrical shell member having its axis inclined forwardly of the vehicle and toward a road surface, said shell having a paraboloidally-shaped cavity therein provided with a light reflecting surface and concentric with and having its center of generation on said axis, said shell member having apertures at opposite ends thereof concentric with said axis and opening into said cavity, a lens in one of said apertures and closing one end of said cavity, a lamp secured in the other of said apertures and closing the opposite end of said cavity, said lamp receiving aperture being of a size sufficient to permit insertion and withdrawal of said lamp therethrough, said lamp being registered substantially with the center of generation of said cavity reflecting surface for projecting light rays toward said cavity-reflecting surface to be thereafter projected in a beam along said axis with the rays of said beam converging toward said axis, and said headlight unit being positioned on said vehicle whereby rays in substantially the lower half of said beam are substantially parallel to said road surface while the rays comprising substantially the upper half of said beam are directed angularly downwardly toward said road surface.

2. A headlight unit for mounting in the headlight casing of an automotive vehicle comprising a generally cylindrical shell member having its axis inclined forwardly of the vehicle and toward a road surface, said shell having a paraboloidally-shaped cavity therein provided with a light reflecting surface and concentric with and having its center of generation on said axis, said shell member having apertures at opposite ends thereof concentric with said axis and opening into said cavity, said shell member having therein an annular notch and an adjacent lip member bordering one of said apertures, a lens in engagement with said notch and said lip member and closing said one of the apertures, lamp mounting means disposed substantially entirely within the other of said apertures, a lamp removably secured in said mounting means and closing the opposite end of said cavity to seal the latter, said lamp having its light generation element registered substantially with the center of generation of said cavity reflecting surface for projecting light rays toward said cavity reflecting surface to be thereafter projected in a beam along said axis with the rays of said beam converging toward said axis, and said headlight unit being positioned on said vehicle whereby rays in substantially the lower half of said beam are substantially parallel to said road surface while the rays comprising substantially the upper half of said beam are directed angularly downwardly toward said road surface.

3. A headlight unit for mounting in the headlight casing of an automotive vehicle comprising a generally cylindrical shell member having its axis inclined forwardly of the vehicle and toward a road surface, said shell having a paraboloidally-shaped cavity therein provided with a light reflecting surface and concentric with and having its center of generation on said axis, said shell member having apertures at opposite ends thereof concentric with said axis and opening into said cavity, said shell member having therein an annular notch and an adjacent lip member bordering one of said apertures, a lens in engagement with said notch and said lip member and closing said one of the apertures, a lamp having a flange member entering the other of said apertures and closing the opposite end of cavity to seal the latter, and means for securing said flange member in said other of the apertures whereby the light generation element of the lamp is registered substantially with the center of generation of said cavity reflecting surface for projecting light rays toward said cavity reflecting surface to be thereafter projected in a beam along said axis with the rays of said beam converging toward said axis, said lamp being removable from said cavity through said other of the apertures, and said headlight unit being positioned in said vehicle whereby rays in substantially the lower half of said beam are substantially parallel to said road surface while the rays comprising substantially the upper half of said beam are directed angularly downwardly toward said road surface.

4. A headlight unit for mounting in the headlight casing of an automotive vehicle comprising a generally cylindrical shell member having its axis inclined forwardly of the vehicle and toward a road surface, said shell having a paraboloidally-shaped cavity therein provided with a light reflecting surface and concentric with and having its center of generation on said axis, said shell member having apertures at opposite ends thereof concentric with said axis and opening into said cavity, said shell member having therein an annular notch and an adjacent lip member bordering one of said apertures, a lens in engagement with said notch and said lip member and closing said one of the apertures, the other of said apertures being provided with a concentric shoulder and having a threaded peripheral surface, a lamp having a flange member entering said other of the apertures and engaging said shoulder to close and seal said cavity and to position the light-generation element of said lamp in substantial registration with the center of generation of said cavity reflecting surface for projecting light rays toward said cavity reflecting surface to be thereafter projected in a beam along said axis with the rays of said beam converging toward said axis, said lamp having its largest cross-sectional area smaller than the cross-sectional area of said other of the apertures whereby said lamp and said flange member may be withdrawn from and out of said aperture, and said headlight unit being positioned on said vehicle whereby rays in substantially the lower half of said beam are substantially parallel to said road surface while the rays comprising substantially the upper half of said beam are directed angularly downwardly toward said road surface.

References Cited in the file of this patent

UNITED STATES PATENTS

| Number | Name | Date |
| --- | --- | --- |
| 1,235,275 | Wood | July 31, 1917 |
| 1,235,276 | Wood | July 31, 1917 |
| 1,434,383 | Harris | Nov. 7, 1922 |
| 1,803,709 | Johnson | May 5, 1931 |
| 2,233,486 | Portnow | Mar. 4, 1941 |
| 2,262,098 | Crook et al. | Nov. 11, 1941 |
| 2,277,563 | Scott et al. | Mar. 24, 1942 |
| 2,304,433 | Zimmer | Dec. 8, 1942 |
| 2,317,035 | Dana | Apr. 20, 1943 |

FOREIGN PATENTS

| Number | Country | Date |
| --- | --- | --- |
| 390,278 | Great Britain | 1933 |
| 391,117 | Great Britain | Apr. 18, 1933 |